3,200,156
α,α,α',α'-TETRAALKOXY-α,α'-DIALKYL-PEROXY-p-XYLENES

Seymour J. Lapporte, Berkeley, Calif., assignor to California Research Corporation, San Francisco, Calif., a corporation of Delaware
No Drawing. Filed June 15, 1961, Ser. No. 117,297
2 Claims. (Cl. 260—610)

This invention relates to novel compounds, namely, the α,α,α',α'-tetraalkoxy-α,α'-dialkylperoxy-p-xylenes prepared by the reaction of an alkyl hydroperoxide and a hexaalkyl diorthoester of terephthalic acid. These compounds are useful as polymerization initiators and are prepared by the reaction of a hexaalkyl diorthoester of terephthalic acid with an alkyl hydroperoxide, preferably at elevated temperatures.

The diorthoester component of these compounds is prepared by reacting an alkali metal alkoxide at reflux temperature with any α,α,α,α',α',α'-hexahaloparaxylene. The alkoxide may be any lower alkoxide, e.g., methyl, ethyl, propyl, butyl, etc. Where the reaction is too slow or incomplete at reflux under atmospheric pressure, the reflux temperature may be increased by operating under pressure. The reaction mixture is refluxed for a sufficient period of time to obtain a desired conversion to the hexaalkyl diorthoester. Suitable reaction times are from an hour up to several days or longer, depending on the particular reactants used and the degree of conversion desired.

If desired, the alkali metal alkoxide may be prepared in situ by dissolving the alkali metal itself in the dry alcohol corresponding to the desired alkoxide. Also, if desired, excess alcohol may be employed to serve as solvent. When the reaction is essentially complete, the resultant slurry is filtered and washed in an alcohol which may be the alcohol corresponding to the alkyl radicals of the hexaalkyl diorthoester. Excess alcohol is then distilled from the filtrate and the residue admixed with water and extracted with chloroform or other suitable solvent. The solvent phase is dried with any conventional drying agent, such as potassium carbonate, and the solvent removed. The residue obtained is purified hexaalkyl orthoterephthalate.

To form the compounds of this invention, the hexaalkyl orthoterephthalate as prepared above is reacted at a temperature from about 0° to 150° C., preferably 20° to 75° C., with an alkyl hydroperoxide in a molar ratio hydroperoxide to diester from about 2:1 to 10:1, or higher, preferably about 3:1 to 5:1. The alcohol corresponding to the alkyl group of the orthoester is given off and the α,α,α',α'-tetraalkoxy-α,α'-dialkylperoxy-p-xylene is obtained. Reaction is continued until the theoretical amount of alcohol is evolved. In practice, about ½ to 2 hours are required, depending on the reaction temperature.

The product is purified by washing and drying according to methods well known in the art. Alternatively, the alcohol formed as well as any unreacted hydroperoxide may be removed by distillation, preferably at reduced pressure. The residue may be distilled further to obtain product, or the residue may be purified by crystallization.

Suitable hydroperoxides for the reaction include any commercially obtainable alkyl hydroperoxides, e.g., t-butylhydroperoxide, t-amylhydroperoxide, decalin hydroperoxide, etc., or substituted alkyl hydroperoxides, e.g., cumene hydroperoxide. t-Butylhydroperoxide is a preferred reactant.

By way of illustration, the following example is presented. However, it must be remembered that this example is included merely to describe the process and the product of this invention in detail, and is not to be construed as placing additional limitations upon the scope of the invention.

EXAMPLE

A solution of sodium methoxide and methanol was prepared by dissolving 75 g. of metallic sodium in 1200 ml. of dry methanol. To this mixture was added 157 g. of α,α,α,α',α',α'-hexachloroparaxylene, and the mixture was refluxed for about six days. At the end of this time, the mixture was further heated to about 200° C. under pressure of 600 p.s.i.g. for five hours. The resultant slurry was then filtered and the filter cake washed with methanol. The methanol was distilled from the filtrate, the residue poured into 1.5 liters of water, and then extracted with chloroform. The chloroform extracts were dried over potassium carbonate, after which the solvent was removed. After crystallization from mixed hexanes, a solid was obtained which was recrystallized from mixed hexanes to give a product melting at 124.8° to 125.5° C. Analysis showed this product to be hexamethylorthoterephthalate. (Found: C, 58.91; H, 7.83. Theory: C, 58.72; H, 7.75.)

17.16 g. of the above hexamethylorthoterephthalate were mixed with 36 g. t-butylhydroperoxide and 200 ml. n-hexane. The mixture was heated to a pot temperature of about 80° C., and a mixture of unreacted hydroperoxide and methanol was removed overhead. The remainder of the unreacted t-butylhydroperoxide was removed by distillation at 0.1 mm. and a pot temperature of about 110° C. The residue was cooled and crystallized from n-decane and n-decane ether, yielding white cubes melting at 92–92.8° C. The analysis of this compound showed it to be α,α,α',α'-tetramethoxy-α,α'-di(t-butylperoxy)-p-xylene as follows:

Chemical analysis

|  | Theory | Found |
| --- | --- | --- |
| Carbon | 59.68 | 59.58 |
| Hydrogen | 8.52 | 8.63 |

An infrared spectrum of the above compound obtained in both carbon disulfide and carbon tetrachloride solutions showed a carbon-hydrogen stretch absorption characteristic of methyl groups at 2870 and 2960 cm.$^{-1}$, a carbon-hydrogen deformation characteristic of the t-butyl group at 1365 and 1385 cm.$^{-1}$, an oxygen-oxygen absorption characteristic of peroxides at 870 cm.$^{-1}$, a carbon-oxygen stretch characteristic of the ether linkage at 1095 cm.$^{-1}$, as well as no characteristic absorption for either carboxyl or hydroxyl groups. This infrared spectrum analysis corroborated the above chemical analysis of this representative compound of the invention.

To illustrate the uses of the compounds of this invention as polymerization initiators, methyl methacrylate was polymerized for 4 hours at 99.2° C. in two experiments, the first using no polymerization initiator and the second using α,α,α',α'-tetramethoxy-α,α'-di-(t-butylperoxy)-p-xylene. In 30 minutes, using no initiator, only 2.1 percent polymer was obtained. With 0.05 mol of the representative invention compound per mol monomer, 8.0 percent polymer was obtained in the same time, the invention compound resulting in about a four-fold increase in polymerization rate.

The experiment was repeated, using styrene as the monomer with and without the invention compound. An increase in polymerization rate was again observed.

Because of their stability at relatively high temperatures, the compounds of the invention are particularly useful in high temperature polymerizations, such as for cross-linking agents for polyethylene or as vulcanizing agents for vinyl silicone rubber.

As will be evident to those skilled in the art, various modifications in this process can be made or followed, in the light of the foregoing disclosure and discussion, without departing from the spirit or scope of the disclosure or from the scope of the claims.

I claim:
1. An $\alpha,\alpha,\alpha',\alpha'$-tetraalkoxy-$\alpha,\alpha'$-dialkylperoxy-p-xylene.
2. $\alpha,\alpha,\alpha',\alpha'$ - tetramethoxy - $\alpha,\alpha'$ - di(t-butylperoxy)-p-xylene.

References Cited by the Examiner

UNITED STATES PATENTS

| | | | |
|---|---|---|---|
| 1,934,659 | 11/33 | Brooker. | |
| 2,621,214 | 12/52 | Deinet | 260—611 |
| 2,630,456 | 3/53 | Bell et al. | 260—610 |
| 2,695,318 | 11/54 | Thiele | 260—611 |
| 2,806,883 | 9/57 | Mikeska et al. | 260—611 X |
| 2,813,127 | 11/57 | White | 260—610 |

FOREIGN PATENTS 1,071,083   12/59   Germany.

OTHER REFERENCES

Rieche et al.: Ber. deut. chem., 91:1942–1946 (1958).

LEON ZITVER, *Primary Examiner.*

HAROLD G. MOORE, *Examiner.*